United States Patent
Sri et al.

(10) Patent No.: US 9,652,793 B2
(45) Date of Patent: May 16, 2017

(54) STAGE-WISE ANALYSIS OF TEXT-BASED INTERACTIONS

(71) Applicant: 24/7 Customer, Inc., Campbell, CA (US)

(72) Inventors: R. Mathangi Sri, Bangalore (IN); Prashant V. Ullegaddi, Bangalore (IN); Vaibhav Srivastava, Bangalore (IN)

(73) Assignee: 24/7 CUSTOMER, INC., Campbell, CA (US)

( * ) Notice: Subject to any disclaimer, the term of this patent is extended or adjusted under 35 U.S.C. 154(b) by 650 days.

(21) Appl. No.: 14/149,761

(22) Filed: Jan. 7, 2014

(65) Prior Publication Data

US 2014/0195378 A1    Jul. 10, 2014

Related U.S. Application Data

(60) Provisional application No. 61/750,729, filed on Jan. 9, 2013.

(51) Int. Cl.
*G06F 17/00* (2006.01)
*G06Q 30/06* (2012.01)

(52) U.S. Cl.
CPC ................ *G06Q 30/0601* (2013.01)

(58) Field of Classification Search
CPC ........................ G06Q 30/06; G06Q 30/0601

USPC ......................................... 235/376; 705/26.41
See application file for complete search history.

(56) References Cited

U.S. PATENT DOCUMENTS

| | | | |
|---|---|---|---|
| 7,720,690 B2* | 5/2010 | Patrick | G06F 17/30663 600/300 |
| 8,976,955 B2* | 3/2015 | Liberman Ben-Ami | H04M 3/5191 379/265.01 |
| 9,112,975 B2* | 8/2015 | Sayko | H04M 3/5191 |
| 2009/0299998 A1 | 12/2009 | Kim | |
| 2010/0185437 A1 | 7/2010 | Visel | |
| 2011/0206198 A1 | 8/2011 | Freedman et al. | |
| 2012/0296642 A1 | 11/2012 | Shammass et al. | |

\* cited by examiner

*Primary Examiner* — Seung Lee
(74) *Attorney, Agent, or Firm* — Perkins Coie LLP; Michael A. Glenn (57) ABSTRACT

The stages of an interaction between a potential customer (the user) and a sales representative (the agent) during a sales interaction are identified to understand the interaction factors that drive sales and, by doing so, to serve the customer better and thus increase sales. Initially, a user makes contact with an agent via a communications network. During the interaction, a dropping point is reached, i.e. the point in the interaction at which either the user or the agent ends the interaction. The dropping point and other interaction factors is analyzed. Based upon such analysis, various recommendations are made to the agents to improve the user's sales experience.

21 Claims, 6 Drawing Sheets

STAGE-WISE ANALYSIS OF TEXT-BASED INTERACTIONS

CROSS REFERENCE TO RELATED APPLICATIONS

This application claims priority to U.S. provisional patent application Ser. No. 61/750,729, filed Jan. 9, 2013, which application is incorporated herein in its entirety by this reference thereto.

BACKGROUND OF THE INVENTION

Technical Field

The invention relates to user relationship management. More particularly, the invention relates to analyzing interactions between a user and an agent.

Description of the Background Art

Currently, users may interact with agents using a variety of channels, such as voice, chat, forums, social networks, and so on. These interactions may relate to the user requesting information from the agent, where the information may be related to sales and/or service. In a sales interaction, users approach a customer care agent with the intent of buying some commodity; whereas in service interactions, users approach a customer care agent for solutions to issues concerning commodities they have already purchased. Such interactions comprise conversations between the agent and the user that are targeted towards the goal of solving the user's problem. These interactions may lead to conclusions, such as the agent resolving the issue and/or query of the user, the user terminating the interaction, the agent terminating the interaction, and so on.

Currently, only minimal analysis is performed on the data that results from these interactions. It is not presently known how to analyze and apply such interaction data effectively.

SUMMARY OF THE INVENTION

Embodiments of the invention predict the various stages of an interaction between a potential customer (the user) and a sales representative (the agent) during a sales interaction. The stages of the interaction are predicted to understand the interaction factors that drive sales and, by doing so, to serve the customer better and thus increase sales. Initially, a user makes contact with an agent via a communications network, which may be a cellular network, a public switched telephone network (PSTN), a VoIP system, an IP network, and so on. During the interaction, a dropping point is reached, i.e. the point in the interaction at which either the user or the agent ends the interaction. The dropping point and other interaction factors are analyzed. Based upon such analysis, various recommendations are made to the agents to improve the user's sales experience.

DETAILED DESCRIPTION OF THE INVENTION

Embodiments of the invention use business analysis to reveal factors related to a sales process or processes, including understanding of sales drivers for sales interactions. The various stages of an interaction between a user and one or more agents are predicted. That is, the interaction is analyzed to predict the stages of the interaction between the user and agent, e.g. greetings, problem identification, details gathering, closure, and so on. The dropping point, i.e. the point in the interaction at which either the user or the agent ends the interaction, is predicted based on prior user interactions. Based on the stage of the interaction and the prediction of the dropping point, recommendations are made to the agent to try different packages, make different offerings, and so on. The recommendations serve the dual purposes of improving the sales experience of the user, and increasing the probability of a conversion, e.g. the user purchases the offered goods and/or services, by altering the interaction to avoid a dropping point that does not produce a conversion. Embodiments of the invention thus predict the stages for a given interaction between a user and an agent. Such information could be further used for many business analyses revealing many factors, such as understanding sales drivers for sales interactions.

In embodiments of the invention, a business application analyzes the drop-off stages for sales chats. A chat that properly finishes usually ends with a closure as its last stage. On the other hand, a chat does not end successfully if either agent or customer does not close out the chat. In such cases, the last stage of the chat does not have a closure. For purposes of the discussion herein, the drop-off point for an incomplete chat is the last stage of a chat, where such stage is not a closure. This means that chat was not successful, which indicates the intended task, e.g. a potential sale in the case of sales chats, did not occur.

In embodiments of the invention, a large corpus of the chats is predicted, with all the stages by using an algorithm in an offline process. The chat corpus is analyzed to identify the drop-off stages at which users predominantly abandon the chat. These stages can then be treated specially by the agent when a current stage of the interaction during run time that is about to be entered or that has been entered is a pre-identified drop-off stage. Analyzing stage paths, i.e. frequent stage paths that lead to these drop-off stages can also provide information that is used to trigger and/or alert the agent at run time if the current interaction also follows such a path. In this way, agents can be trained to handle such alerts and thus produce better sales results.

Figure 1:
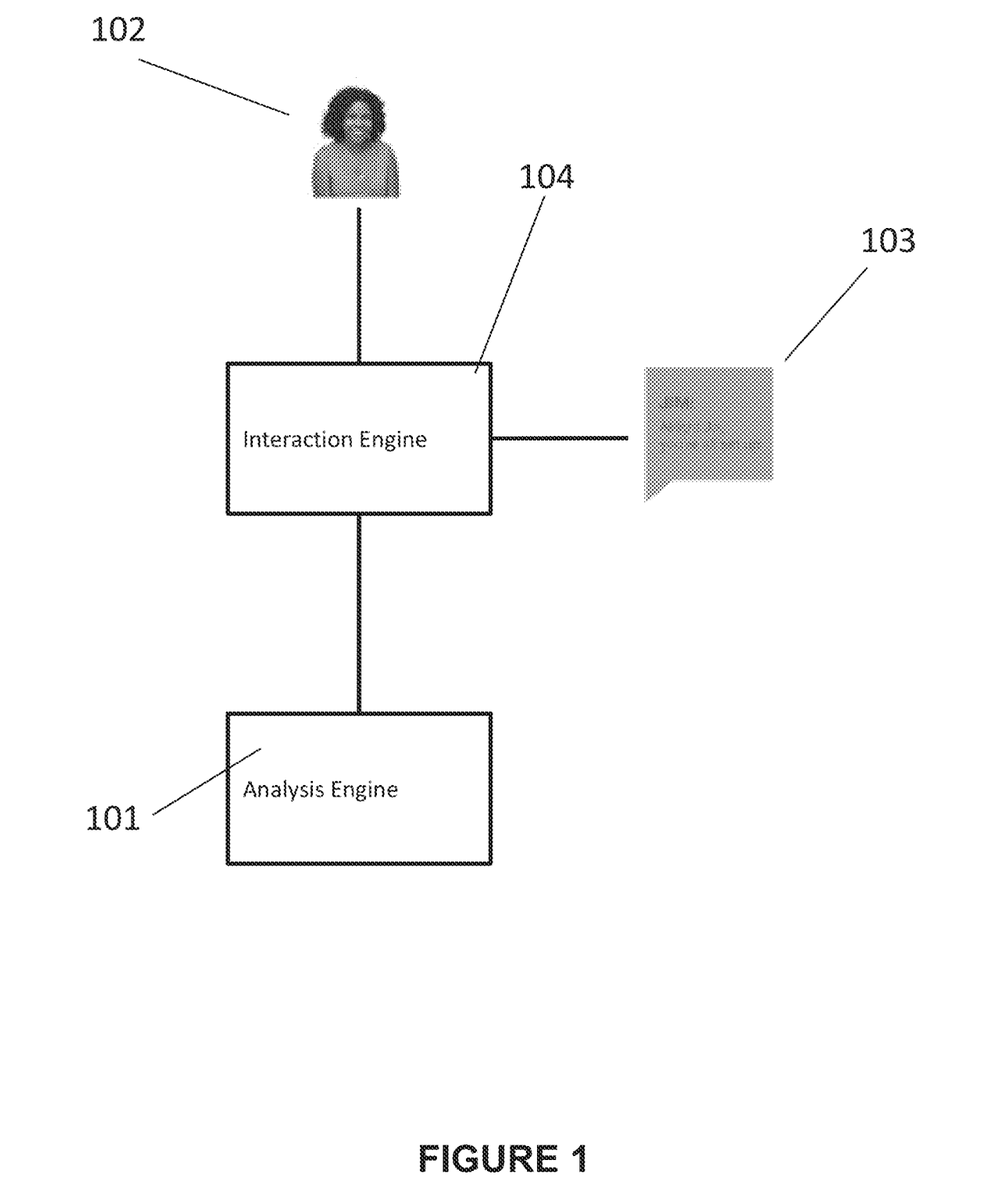
FIG. 1 is a block schematic diagram that shows an apparatus for stage-wise analysis of text-based interactions according to the invention.

FIG. 1 is a block schematic diagram that shows an apparatus for stage-wise analysis of text-based interactions according to the invention. Embodiments of the invention that are discussed herein concern user management in a sales and/or service environment, although those skilled in the art will appreciate that the invention has other applications. The apparatus shown in FIG. 1 comprises an interaction engine 104. A user 102 and an agent 103 access the interaction engine 104 and interact with each other using the interaction engine 104. The interaction engine 104 uses any available channel, such as a cellular based communication network, an Internet Protocol (IP) based network, a packet based communication system, a public switched telephone network (PSTN) based network, a voice over IP (VoIP) based network, and so on, as the medium of communications. The user device may be a mobile phone, a handheld device, a tablet, a computer, a telephone, or any other device that is capable of communicating with the communication network 102. The interaction engine 104 enables the user 102 to interact with at least one agent 103. The mode of interaction between the agent 103 and the user 102 may be at least one of voice-based; text-based, such as chat; social network-based; forums-based; or any other equivalent mode, or combination of modes, that allows the agent 103 and the user 102 to interact with each other.

The analysis engine 101 captures the text of the interaction from the interaction engine 104 through a database at the backend to which interaction engine 104 pushes the interaction data, i.e. chat text, for off-line processing. At run time, analysis engine 104 directly fetches the data from interaction engine 101 through an API interface. This facilitates the provision of runtime applications that perform drop-off analysis, such as applications that alert an agent of a potential drop-off by a customer, as discussed before. As discussed below in greater detail, the analysis engine 101 classifies the interaction into various stages, such as greetings, problem identification, gathering further details, trouble shooting, closure, and so on. Table 1 below is an example of the various stages of a chat interaction between the agent 103 and the user 102 are depicted.

TABLE 1

Stages of a Chat Interaction

| Chat Line Number | Chat line | Who | Stage |
|---|---|---|---|
| 1 | Thank you for contacting XXX Sales Chat. My name is XXX and my Rep ID is XXX. How may I help you purchase XXX products and services today? | Agent | Greetings |
| 2 | hello I was hoping to use one of your coupons to make a purchase but it didn't work even though it had not expired | User | Problem Identification - Promotions |
| 3 | I am sorry for the inconvenience caused. | Agent | Problem Identification - Promotions |
| 4 | it is for your XXXPad XXX | User | Problem Identification - Promotions |
| 5 | May I know the model you are trying to purchase? | Agent | Gathering Further Details - Configuration |
| 6 | XXX | User | Gathering Further Details - Configuration |
| 7 | Is it a XXX1 or XXX2? | Agent | Gathering Further Details - Configuration |
| 8 | I had a coupon that reduces the price down to $$$, it worked last night, but when I tried it just now it failed; XX1 | User | Gathering Further Details - Configuration |
| 9 | Please try to paste XYZABC123 eCoupon and click on the "Activate eCoupon" option present on the right side of your monitor screen | Agent | Trouble Shooting - Promotions |
| 10 | . . . | . . . | . . . |
| . . . | . . . | . . . | . . . |
| . . . | . . . | . . . | . . . |

The above example is exemplary and does not restrict the interaction to a chat interaction. Those skilled in the art will appreciate that a classification of the sort disclosed above can readily be applied to any form of user/agent interaction, such as voice based, social network, forum, and so on.

Based on the classification of interactions into stages, the analysis engine 101 determines the dropping point for each interaction. As discussed above, the dropping point for an incomplete interaction is taken to be that stage at which the interaction was ended either by the customer or the agent, where that stage is not a closure. For purposes of the discussion herein, the dropping point, i.e. the stage of a chat, is the point at which each interaction terminates. Based on the classification and the determined dropping point, the analysis engine 101 provides recommendations to operations and/or to the agent. The analysis engine 101 may also provide recommendations for interaction flow structuring and/or restructuring, such as shuffling one of the stages that results in more frequent drop-offs.

Figure 3:
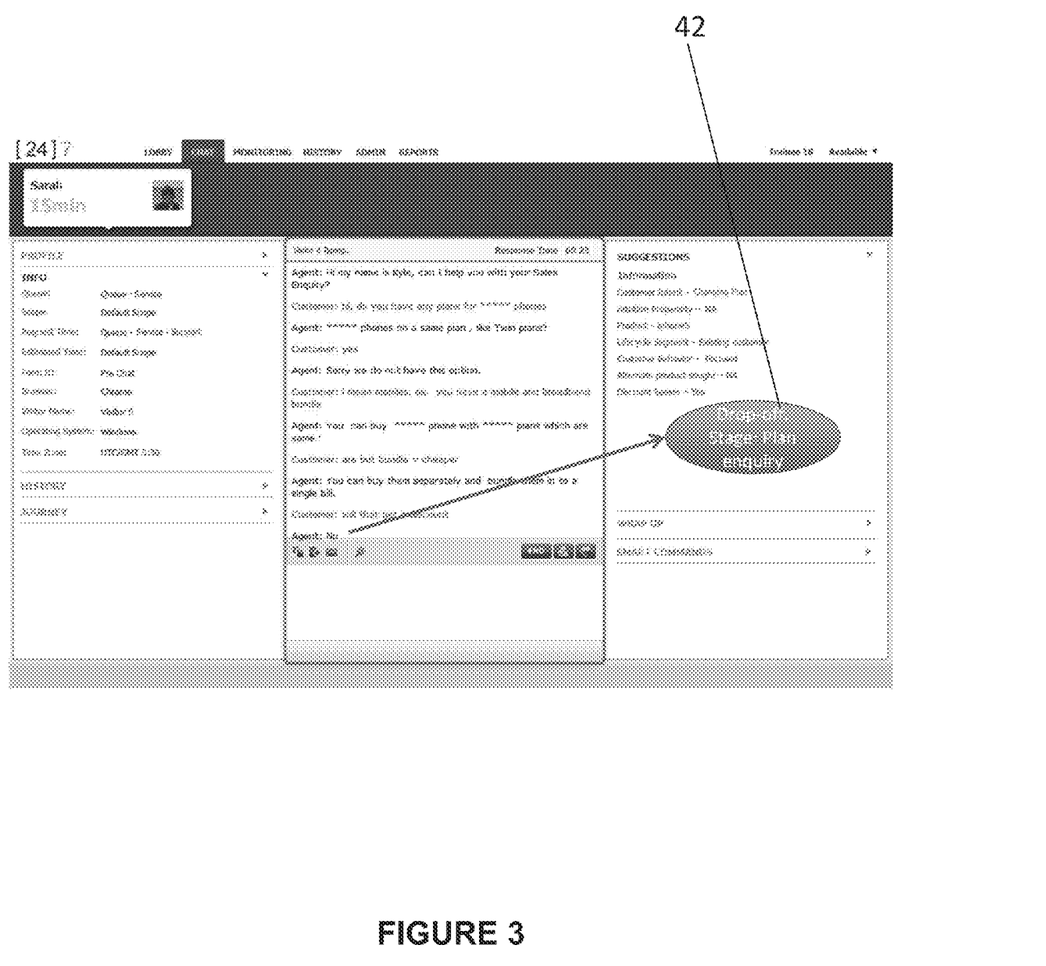
FIG. 3 is an agent screen that shows user drop-off at a plan inquiry stage according to the invention.
Figure 4:
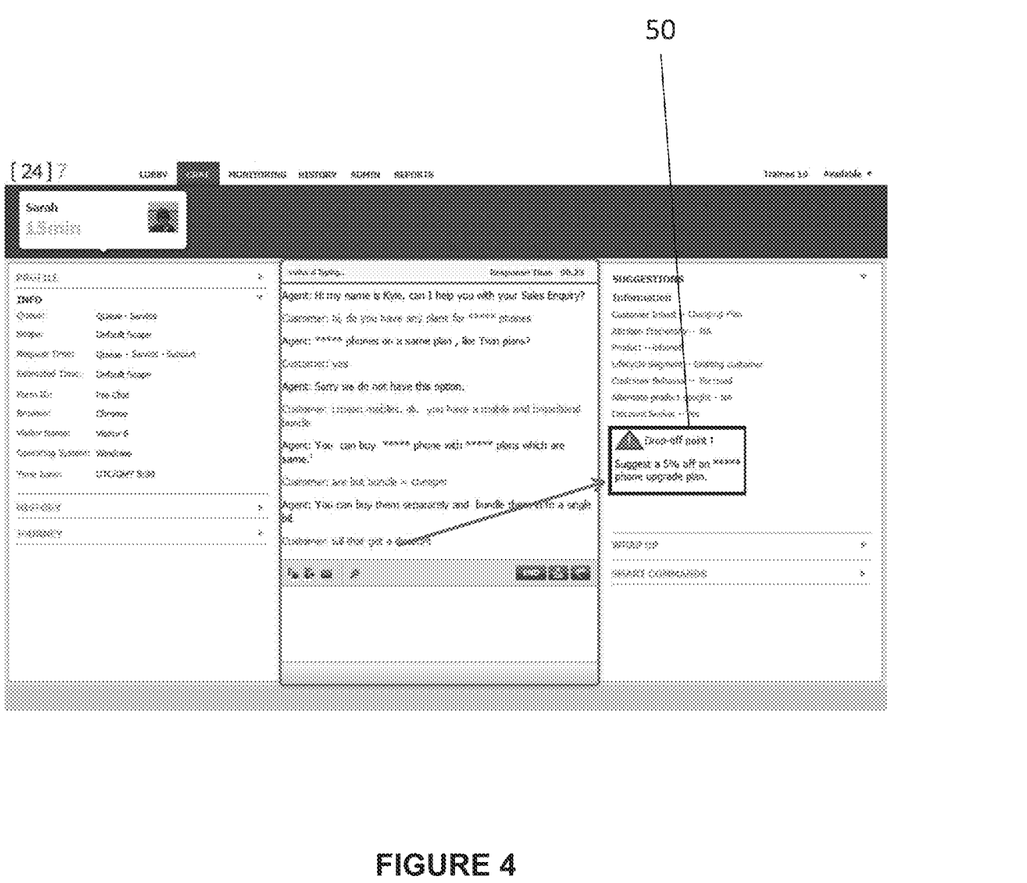
FIG. 4 is an agent screen that shows an alert that is provided to the agent and a possible suggestion to the agent to avoid drop off according to the invention.

One goal is to avoid an unfavorable drop-off by predicting such stage of a present interaction and then modifying the interaction to achieve a favorable result. This situation is illustrated in FIGS. 3 and 4, where FIG. 3 is an agent screen that shows user drop-off at a plan inquiry stage 42, and FIG. 4 is an agent screen that shows an alert 50 that is provided to the agent and a possible suggestion to the agent to avoid drop off.

The analysis engine 101 also provides information to agents that can be pushed to users in other forms of interaction and/or in other widgets the may be accessed by the user during user/agent interactions. Examples of such widgets include, but are not limited to, slider push, alerts, etc. A slider push is typically a window with an action relevant to the current interaction, where the window that is pushed to the agent console, and upon which the agent may choose to act.

To optimize the flow of these pushes, the analysis engine 101 personalizes the interaction at the user level. This is done by mining the Web journey that eventually leads to the interaction. For example, assume that the user browses for tablets on a vendor website, is offered a chat pop-up, and the offer is accepted. In this case, it is known that the user has predominantly browsed Web pages belonging to the tablets category. Hence, this interaction can be personalized at the user level, such that the agent is pre-informed about the user's interests, which helps the agent personalize the interaction. This provides an enhanced user experience and an improvement in user engagement during the interaction.

The analysis engine 101 also optimizes the flow based on drop-off and visitor level during a user Web journey, as well as interaction events, such as form push, sliders, and so on. For example, from the offline processing of chats it is determined that certain chat flows, i.e. stage paths, lead to drop-off points, as discussed above. If the analysis engine 101 is equipped with such knowledge about bad chat flows, it can alert the agent when such a chat flow is detected in the current interaction at run time. Alternatively, certain pre-defined suggestions and/or actions could be pushed, e.g. as a slider, to the agent console. In this way analysis engine 101 provides an offline voice of user flow recommendations to operations and/or clients to enhance the performance of agents and thus optimize the sales process.

Based on the above recommendation, the analysis engine 101 predicts the drop-off point at the start the interaction and re-evaluates the drop-off intent. Based on these models, the analysis engine 101 flashes alerts to the agents as to whether or not they should push sliders and/or forms to the user. An agent screen depicting such alert is shown in FIG. 4. The analysis engine 101 may also recommend the use of other information channels, e.g. weblogs, social, chat-events, chat-journey, to make this flow much more contextual.

The analysis engine 101 also comprises a mechanism that provides for re-targeting users, once the drop-off has occurred. See copending, commonly assigned U.S. patent application Ser. No. 14/142,698, filed Dec. 27, 2013 (Tracking of Near-Conversions in User Engagements), which application is incorporated herein in its entirety by this reference thereto.

Figure 2:
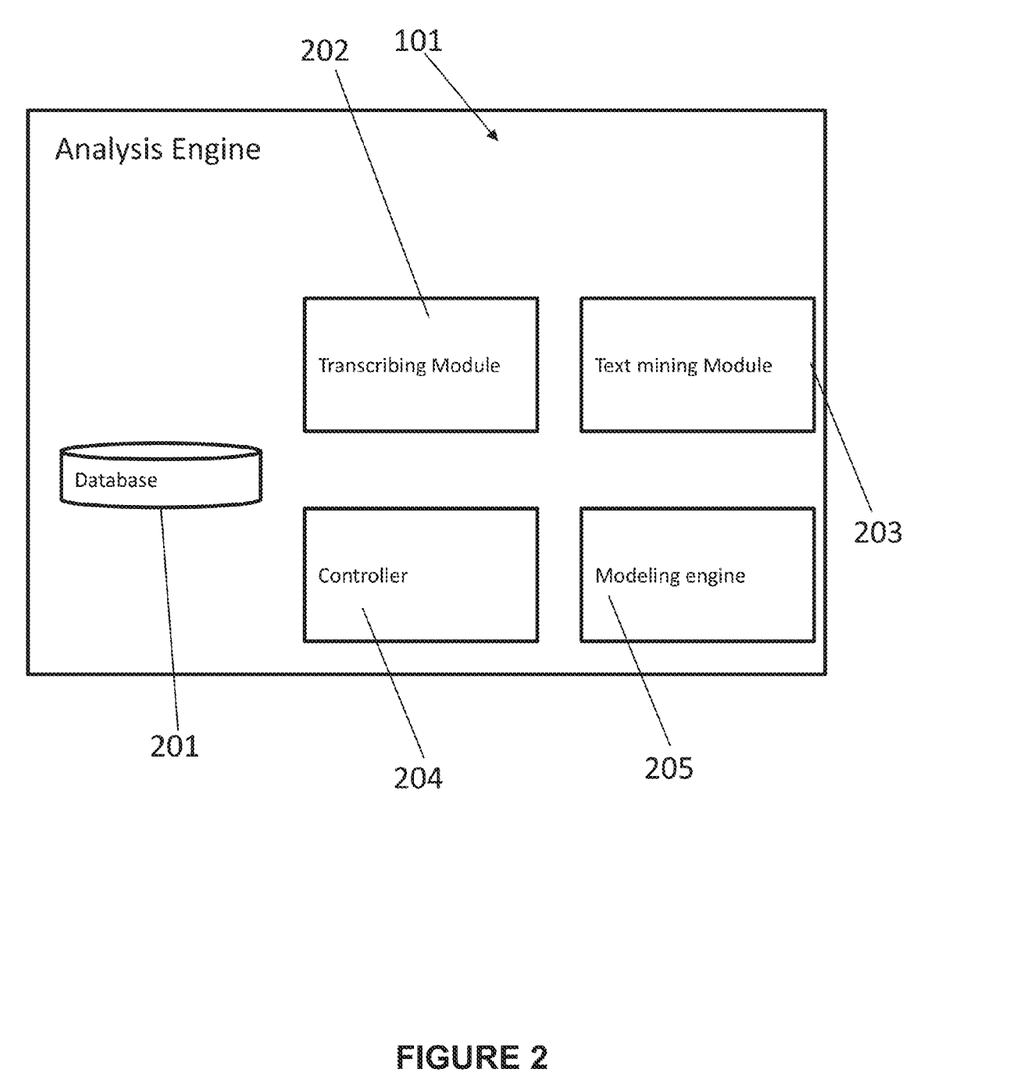
FIG. 2 is a block schematic diagram that shows an analysis engine according to the invention.

FIG. 2 is a block schematic diagram that shows an analysis engine according to the invention. In an embodiment of the invention, the analysis engine 101 comprises a control engine 204, a transcribing module 202, a text mining module 203, and a database 201.

The control engine 204 receives the text of the interaction from the interaction engine 104 via the interface 203. In an embodiment of the invention, the control engine 204, upon receiving a recording of a voice-based interaction, sends the recording to the transcribing module 202 to transcribe the recording into text. The control engine 204 labels each line of the interaction into various stages, such as greetings, problem identification, gathering further details, trouble shooting, closure, etc., as discussed below.

The control engine 204 implements an algorithm which labels sequences of text into stages. An embodiment of the invention uses a hidden Markov model (HMM) based approach to classify the interactions into stages. In a hidden Markov model, the state, i.e. the stage, is not directly visible but output, i.e. the conversation between agent and customer, dependent on the state is visible. Each state has a probability distribution over the possible output tokens. Therefore, the sequence of tokens generated by an HMM gives some information about the sequence of states. Note that the adjective 'hidden' refers to the state sequence through which the model passes, not to the parameters of the model; even if the model parameters are known exactly, the model is still hidden.

In another embodiment of the invention, the control engine 204 consists of a greedy sequence classifier (see below), which is an algorithm that uses the stage predicted for a previous chat line to make a prediction for the stage of the current chat line in the process labeling the entire conversation into stages. In another embodiment of the invention, the control engine 204 consists of a conditional random fields (CRF) algorithm (see below), which is a well-known algorithm for segmenting the data and labeling each into stages.

Further, to distinguish between agent and customer text, the control engine 204 learns different discriminative keywords for agent text and user text, otherwise referred to as emission probability distribution, i.e. different emission probability distributions for the agent and the user, and system generated text, to classify the text. This is done by learning different probability distributions for the words that are typically used by the agent and the user. For example, the words such as "business" and "days" occur with high probability in agent lines. Thus, by treating the emission probabilities, i.e. the chances of observing a particular word in a particular stage, differently for the agent and the user a better classification is performed and, hence, the stage predictions are improved.

Based on the classifications of the interactions into stages, the control engine 204 determines the dropping point for each of the interactions. As noted above, the dropping point is the point at which each interaction terminates. Based on the classification and the determined dropping point, the control engine 204 provides recommendations to operations and/or to the agent. The control engine 204 may also provide recommendations for interaction flow structuring and/or restructuring, such as shuffling one of the stages that makes more frequent drop-offs.

The control engine 204 also provides information to agents with regard to pushing forms and other widgets for use during the interactions. To optimize the flow of these pushes, the analysis engine 101 personalizes the interaction at the user level. This provides an enhanced user experience and an improvement in user engagement during the interaction. The control engine 204 also optimizes the flow based on drop-off and visitor level during the user's Web journey, as well as interaction events, such as form push, sliders, and so on.

The control engine 204 provides offline voice-of-the-user flow recommendations to operations and/or clients to enhance the performance of agents and to optimize the sales process. This is accomplished through agent training, based upon the information that is discovered by the control engine 201 after analyzing a large corpus of interactions offline. Such information is sent in the form of recommendations to the operations center. Such information can include the particular stages at which agents fail to provide a good user experience, which results in frequent drop-offs by the users. This information can help train agents to handle such situations and keep the user engaged, eventually leading to a better user experience that converts the interaction into a sale.

Based on the above recommendation, the control engine 204 predicts the drop-off point at the start the interaction and re-evaluates the drop-off intent. Based on these models, the control engine 204 flashes alerts to the agents regarding whether or not the agent should push slider and/or forms to the user. The control engine 204 may also recommend the use of other information channels, e.g. weblogs, social, chat-events, chat-journey, to make this flow much more contextual.

The database 201 is used for storing information, such as the text, the classifications as performed by the control engine 204, and so on.

Figure 5:
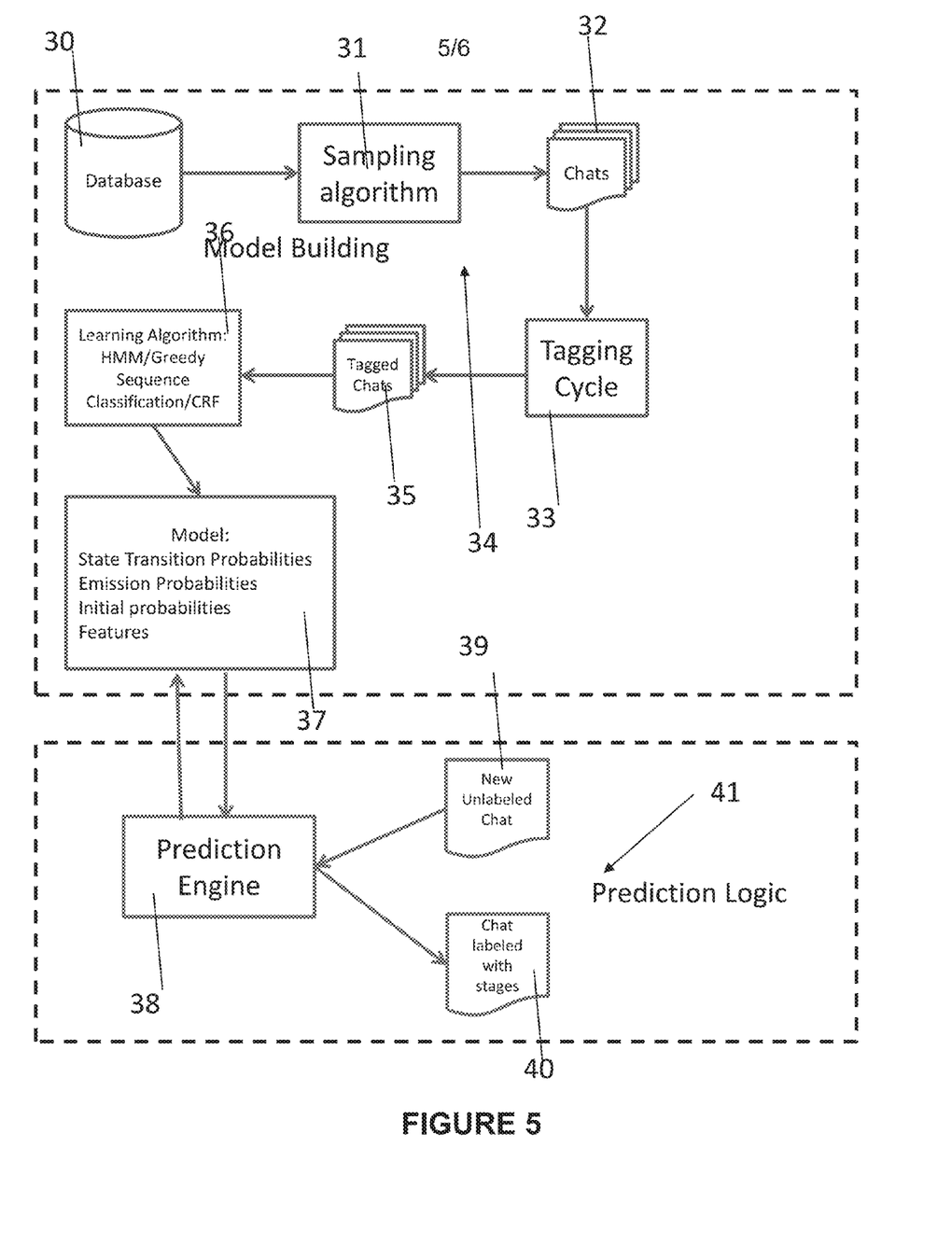
FIG. 5 is a block schematic diagram that shows model building and prediction logic according to the invention.

FIG. 5 is a block schematic diagram that shows model building and prediction logic according to the invention. In FIG. 5, an offline model building stage 34 produces a model interacts with prediction logic 41 during run time.

During the model building stage, the chat database 30 is queried by a sampling algorithm 31 for chats 32. The chats are processed during a tagging cycle 33 in which the chats are run through a tagging team which manually labels each chat with stages. Iterations are performed to ensure consistency in labeling. The results of the tagging cycle are tagged chats 35 which comprise the training data for model building. The tagged chats are provided to a learning algorithm 36, discussed below. As a result, a model 37 is produced that includes state transition probabilities, emission probabilities, initial probabilities, and features.

The model interacts with the prediction logic 41 during run time through a prediction engine 38. When a new, unlabeled chat 39 is received at the prediction engine, the chat is processed and a chat labeled with stages 40 is produced.

Stage wise prediction of chats using Sequence Labeling

In the following discussion, it is assumed that training data consisting of N chats is:

$$D=\{X^{(i)}, Y^{(i)}; i=1 \ldots N\} \quad (1)$$

where each chat line $X_j^{(i)}$ at $j^{th}$ unit of time $X^{(i)}$ is tagged with stage $Y_j^{(i)}$.

Three approaches to this problem are presented, namely greedy sequence classifier (GS), Hidden Markov Models (HMMs) and conditional random fields (CRFs) that exploit the nature of sequence in stages. These approaches are discussed below.

Greedy Sequence Classifier (GS)

This approach uses a naive Bayes classifier with sequence information embedded. First, the stage for a chat line is predicted by using the information about the stage of the previous chat line. This is done as follows:

Predict a stage $Y^*_j$ for any chat line $X_j$ given the previous stage $Y^*_{j-1}$ as follows:

$$Y^*_j = \arg\max_{Y_j} P(Y_j | X_j, Y_{j-1}) \quad (2)$$

Further, using the chain rule of probability:

$$P(X_j, Y_j, Y_{j-1}) = P(X_j | Y_j, Y_{j-1}) P(Y_j | Y_{j-1}) P(Y_{j-1}) \quad (3)$$
$$= P(Y_j | X_j, Y_{j-1}) P(X_j | Y_{j-1}) P(Y_{j-1})$$

$$P(Y_j | X_j, Y_{j-1}) \propto P(X_j | Y_j) P(Y_j | Y_{j-1})$$

A stage for line $X_j$ is thus predicted as:

$$Y^*_j = \arg\max_{Y_j} P(X_j | Y_j) P(Y_j | Y_{j-1}) \quad (4)$$

The probability $P(X_j | Y_j)$ is called emission probability, i.e. the probability of emitting $X_j$ when in stage $Y_j$. This can be estimated from training data as:

$$P(X_j | Y_j) = \Pi_{for\ each\ word\ \omega \in X_j} P(\omega | Y_j) \quad (5)$$

The probability $P(Y_j | Y_{j-1})$ is called state transition probability, i.e. the probability of transitioning from state $Y_{j-1}$ to $Y_j$. The word emission $(P(w|Y_j))$ and state transition probabilities can be computed from training data.

Hidden Markov Models (HMMs) and Conditional Random Fields (CRFs)

These are well known algorithms for labeling sequence data.

HMMs are probabilistic models for segmenting and labeling input data. HMMs model the joint probability $P(Y^{(i)}$ AND $X^{(i)})$.

CRFs are probabilistic models for segmenting and labeling input data that directly model the conditional probability $P(Y^{(i)}|X^{(i)})$ where $X^{(i)}$ is a chat segmented into stages $Y^{(i)}$.

Computer Implementation

The embodiments of the invention disclosed herein concern the optimization of ad words based on performance across multiple channels. This allows integration of various data sources to provide a better understanding of the user intent associated with user entered search terms. The embodiments disclosed herein can be implemented through at least one software program running on at least one hardware device and performing network management functions to control the network elements. The network elements shown in FIGS. 1 and 2 include blocks which can be at least one of a hardware device, or a combination of hardware device and software module.

Figure 6:
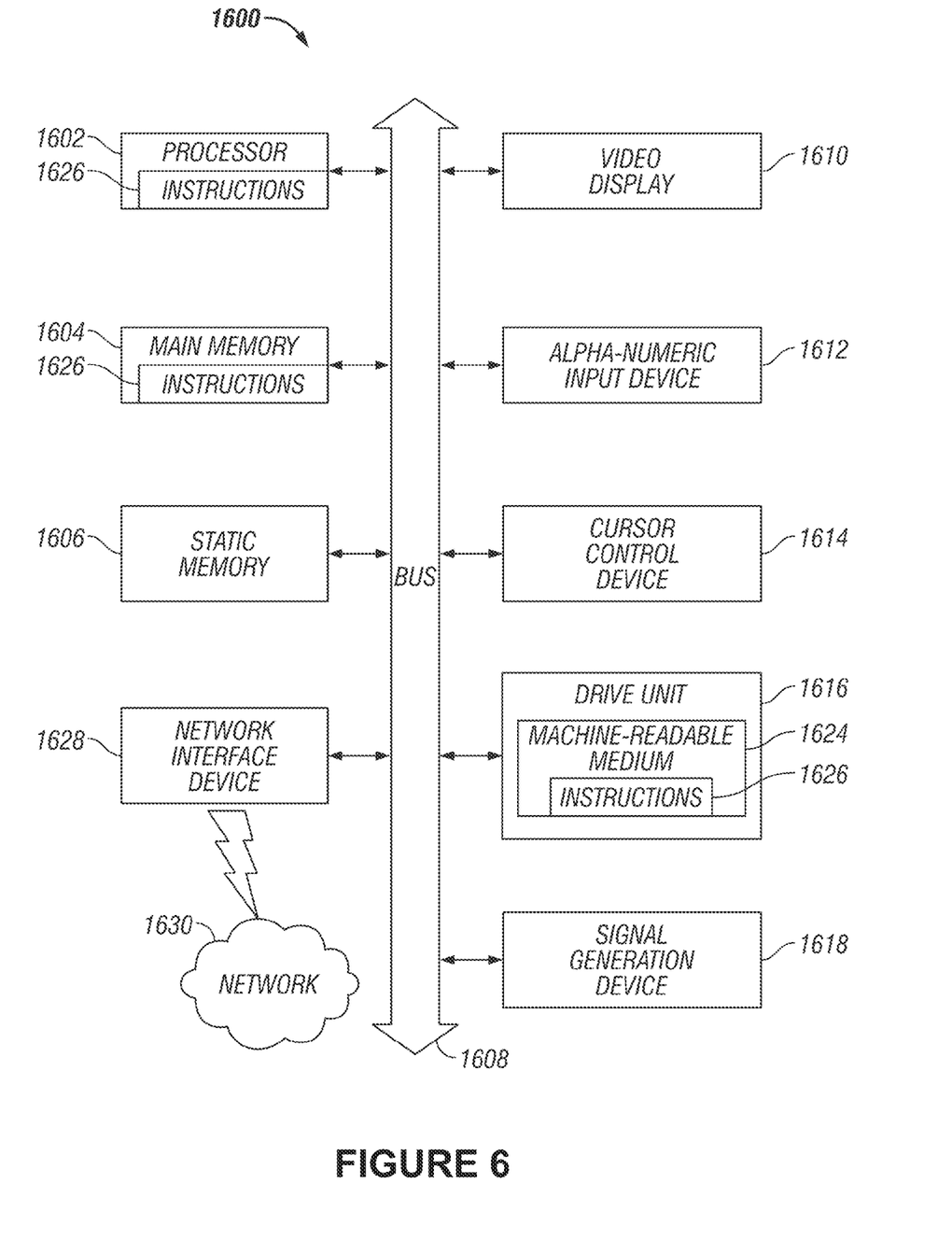
FIG. 6 is a block schematic diagram that depicts a machine in the exemplary form of a computer system within which a set of instructions for causing the machine to perform any of the herein disclosed methodologies may be executed.

FIG. 6 is a block schematic diagram that depicts a machine in the exemplary form of a computer system 1600 within which a set of instructions for causing the machine to perform any of the herein disclosed methodologies may be executed. In alternative embodiments, the machine may comprise or include a network router, a network switch, a network bridge, personal digital assistant, a cellular telephone, a Web appliance or any machine capable of executing or transmitting a sequence of instructions that specify actions to be taken.

The computer system 1600 includes a processor 1602, a main memory 1604 and a static memory 1606, which communicate with each other via a bus 1608. The computer system 1600 may further include a display unit 1610, for example, a liquid crystal display (LCD). The computer system 1600 also includes an alphanumeric input device 1612, for example, a keyboard; a cursor control device 1614, for example, a mouse; a disk drive unit 1616, a signal generation device 1618, for example, a speaker, and a network interface device 1628.

The disk drive unit 1616 includes a machine-readable medium 1624 on which is stored a set of executable instructions, i.e. software, 1626 embodying any one, or all, of the methodologies described herein below. The software 1626 is also shown to reside, completely or at least partially, within the main memory 1604 and/or within the processor 1602. The software 1626 may further be transmitted or received over a network 1630 by means of a network interface device 1628.

In contrast to the system 1600 discussed above, a different embodiment uses logic circuitry instead of computer-executed instructions to implement processing entities. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer implemented method for user analysis, comprising:
   providing an interaction engine;
   using said interaction engine to capture an interaction between at least one agent and a user;
   providing an analysis engine;
   classifying, with said analysis engine, said interaction into one or more stages of said interaction;
   said analysis engine further implementing an algorithm which labels sequences of text into said stages;
   said analysis engine further implementing a greedy sequence classifier algorithm that uses a stage predicted for a previous chat line to make a prediction for the stage of a current chat line to classify an entire conversation into stages;
   said analysis engine identifying the stage of interaction, based on the classification predicted by the analysis engine; and
   based on said classifying, providing recommendations to said agent to improve the user experience in the interaction.

2. The method of claim 1, further comprising:
   using the classification predicted by the analysis engine for offline analysis and agent performance improvement.

3. The method of claim 1, further comprising:
   based on said classifying, predicting any of a dropping point and recommendations leading to conversion.

4. The method of claim 1, further comprising:
   providing said recommendations at any of a plurality of said stages.

5. A computer implemented method for stage-wise analysis of text-based interactions between a user and at least one agent in a sales and/or service environment, comprising:
   providing an interaction engine with which said user and said agent interact with each other via any of a plurality of available channels as the medium of communications;
   an analysis engine capturing text of said interaction from said interaction engine;
   said analysis engine implementing an algorithm which labels sequences of text into said stages;
   said analysis engine implementing a greedy sequence classifier algorithm that uses a stage predicted for a previous chat line to make a prediction for the stage of a current chat line to classify an entire conversation into stages;
   based on the classification of said interaction into stages, said analysis engine providing recommendations to said agent; and
   said analysis engine predicting the stage of a present interaction and modifying said interaction to achieve a favorable result.

6. The method of claim 5, wherein a mode of interaction between said agent and said user comprises any of voice-based, text-based, social network-based, and forums-based.

7. The method of claim 5, wherein said channel comprises any of a cellular based communication network, an Internet Protocol (IP) based network, a packet based communication system, a public switched telephone network (PSTN) based network, and a voice over IP (VoIP) based network.

8. The method of claim 5, wherein said user interacts via a device that comprises any of a mobile phone, a handheld device, a tablet, a computer, and a telephone.

9. The method of claim 5, further comprising:
   said analysis engine providing information to said agent that is pushed to said user in other forms of interaction and/or in one or more widgets the may be accessed by the user during said user/agent interaction.

10. The method of claim 5, further comprising:
    said analysis engine personalizing said interaction at the user level.

11. The method of claim 5, further comprising:
    said analysis engine optimizing flow based on any of drop-off, visitor level during a user Web journey, and interaction events.

12. The method of claim 5, further comprising:
    based on said recommendation, said analysis engine predicting drop-off point at the start said interaction and re-evaluating the drop-off intent.

13. The method of claim 12, further comprising:
    said analysis engine sending alerts to said agent to advise said agent whether or not sliders and/or forms should be pushed to the user.

14. The method of claim 12, further comprising:
    said analysis engine recommending at least one channel other than a current channel as a mode of communication.

15. The method of claim 5, further comprising:
    said analysis engine re-targeting users, once a drop-off has occurred.

16. The method of claim 5, further comprising:
    determining dropping point for said interaction, wherein the dropping point corresponds to a stage of the interaction at which the interaction terminates; and
    based on the classification and the determined dropping point, said analysis engine making said recommendations.

17. A method for analyzing interactions between a user and at least one agent, comprising:
    providing a control engine for receiving text of the interaction from an interaction engine via an interface;
    said control engine sending a recording to a transcribing module to transcribe said recording into text upon receiving a recording of a voice-based interaction;
    said control engine implementing an algorithm which labels sequences of text into said stages;
    said control engine implementing a greedy sequence classifier algorithm that uses a stage predicted for a previous chat line to make a prediction for the stage of a current chat line to classify an entire conversation into stages;
    based on the classifications of the interactions into stages, said control engine configured for determining a stage for each of a plurality of interactions;
    based on the classification and the determined stage, said control engine configured for providing recommendations to said agent.

18. The method of claim 17, said control engine implementing a hidden Markov model (HMM) based approach to classify said interactions into stages.

19. The method of claim 17, further comprising:
to distinguish between said agent and said user text, said control engine learning different discriminative keywords for agent text and user text to classify said text.

20. The method of claim 17, further comprising:
said control engine providing recommendations for interaction flow structuring and/or restructuring.

21. An apparatus for user analysis, comprising:
an interaction engine for capturing an interaction between at least one agent and a user; and
an analysis engine for classifying, with said analysis engine, said interaction into one or more stages of said interaction;
said analysis engine further comprising an algorithm which labels sequences of text into said stages;
said analysis engine further comprising a greedy sequence classifier algorithm that uses a stage predicted for a previous chat line to make a prediction for the stage of a current chat line to classify an entire conversation into stages;
said analysis engine identifying the stage of interaction, based on the classification predicted by the analysis engine; and
said analysis engine providing recommendations to said agent to improve the user experience in the interaction, based on said classifying.

* * * * *